US008299931B2

(12) United States Patent
Eggleston

(10) Patent No.: US 8,299,931 B2
(45) Date of Patent: Oct. 30, 2012

(54) ICE SAFETY DEVICE

(76) Inventor: Zoe Eggleston, Newtown, CT (US)

( * ) Notice: Subject to any disclaimer, the term of this patent is extended or adjusted under 35 U.S.C. 154(b) by 712 days.

(21) Appl. No.: 12/550,515

(22) Filed: Aug. 31, 2009

(65) Prior Publication Data

US 2011/0050429 A1 Mar. 3, 2011

(51) Int. Cl.

| | |
|---|---|
| ***G08B 19/02*** | (2006.01) |
| ***G08B 21/00*** | (2006.01) |
| ***G01W 1/00*** | (2006.01) |
| ***G01F 23/00*** | (2006.01) |

(52) U.S. Cl. ........ 340/580; 340/612; 340/615; 340/623; 340/624; 73/170.17; 73/170.22; 73/170.26; 73/290 R; 73/298; 73/305; 73/319

(58) Field of Classification Search ........................ None
See application file for complete search history.

(56) References Cited

U.S. PATENT DOCUMENTS

| | | | | |
|---|---|---|---|---|
| 3,240,064 | A | 3/1966 | Sharp | |
| 3,595,537 | A * | 7/1971 | Kaelin | 261/91 |
| 4,287,472 | A | 9/1981 | Pan et al. | |
| 4,375,721 | A | 3/1983 | Ueda | |
| 4,418,570 | A | 12/1983 | Warren, Jr. et al. | |
| 4,426,885 | A * | 1/1984 | Visco | 73/865.8 |
| 5,427,137 | A * | 6/1995 | Bowen | 137/432 |
| 5,485,866 | A * | 1/1996 | Bowen | 137/554 |
| 6,463,800 | B2 | 10/2002 | Fowler | |
| 2008/0295599 | A1 | 12/2008 | Clasen et al. | |
| 2011/0154879 | A1* | 6/2011 | Stoddard et al. | 73/1.02 |
| 2011/0200452 | A1* | 8/2011 | Noel | 417/44.1 |

FOREIGN PATENT DOCUMENTS

JP 60260871 A 12/1985

* cited by examiner

*Primary Examiner* — Julie Lieu
(74) *Attorney, Agent, or Firm* — McCormick Paulding & Huber LLP

(57) ABSTRACT

An inexpensive and simple-to-operate ice safety device is provided for deployment in a body of water. Once deployed, the ice safety device can be activated to check whether ice has formed to a predetermined thickness around the ice safety device. If ice has not formed to the predetermined thickness, the ice safety device indicates an unsafe condition. The ice safety device can be moored to a fixed location.

20 Claims, 2 Drawing Sheets

ICE SAFETY DEVICE

FIELD OF THE INVENTION

The present invention relates to an ice safety device and, more particularly, to a device for determining when the thickness of ice on a body of water has reached a thickness prescribed as safe for supporting a selected load such as human weight.

BACKGROUND OF THE INVENTION

Ice thickness is an important question for many types of winter sports or other load-bearing tasks. For example, pond ice is not regarded as generally safe for skating until substantially clear ice has formed to about six inches thickness. Lake ice is considered safe for ice fishing when the thickness has reached about twelve inches to allow for movement of heavy loads across the ice. In the Arctic, winter roads across bodies of water are not opened until the underlying icebed has thickened to twenty or more inches.

Various apparatuses and methods have been developed for measuring ice thickness. For example, ice thickness has been measured by forming an electrical circuit with an existing ice sheet connected in series to a power supply, and then checking the resistance of the circuit, as taught by U.S. Pat. No. 4,287,472 issued to Pan. Ice thickness also has been measured by deploying two induction coils above an ice sheet, energizing one coil, and estimating the thickness of the ice sheet based on the power produced by the second coil, as taught by U.S. Pat. No. 4,418,570 issued to Warren, Jr. Ultrasonic and radar measurement devices also have been employed, for example by Clasen (US 2008/0295599). However, these electrical or non-penetrating methods have wide ranges of error—up to thirty five percent (35%) for the induction apparatuses, as reported by Pan. More simply, ice thickness has been measured by drilling a hole and lowering a ruler to the undersurface of the ice sheet, as taught by U.S. Pat. No. 4,375,721 issued to Ueda.

However, all these measurement methods require expensive and complicated electronic equipment and/or physical presence of a measuring person on the ice sheet being measured. Expensive equipment is not preferred for most winter sports or other tasks, while the physical presence of a measuring person is not desirable until after safe ice thickness already has been verified. Thus, it is desirable to provide an inexpensive device that can indicate to someone at a remote location off the ice when the ice has reached a safe thickness for winter sports or other tasks.

BRIEF SUMMARY OF THE INVENTION

In accordance with the present invention, an ice safety device includes a floating base that is deployed on a body of water before the water freezes. The floating base supports a tube that houses a rod slidably movable within the tube. The tube extends from the floating base to an open distal end disposed at a predetermined distance below the waterline of the floating base. The rod has a near end housed within the tube and has a far end that protrudes from the distal end of the tube. At least a portion of the rod adjacent to the far end is exposed to the body of water outside the tube. A remotely controlled motor is connected with the rod to move the rod between extended and retracted positions. An indicator on the floating base provides an indication of the rod position. If ice has not formed around the rod in the extended position, the rod can be retracted into the tube to provide an indication that ice thickness is unsafe. If ice has formed around the rod, the rod cannot be retracted, and the ice safety device does not provide an indication of an unsafe condition. Thus, until ice forms below the tube, the ice safety device provides an "unsafe" or "no-go" indication of thin ice conditions.

These and other objects, features and advantages of the present invention will become apparent in light of the detailed description of the best mode embodiment thereof, as illustrated in the accompanying drawings.

DETAILED DESCRIPTION OF PREFERRED EMBODIMENTS

Figure 1:
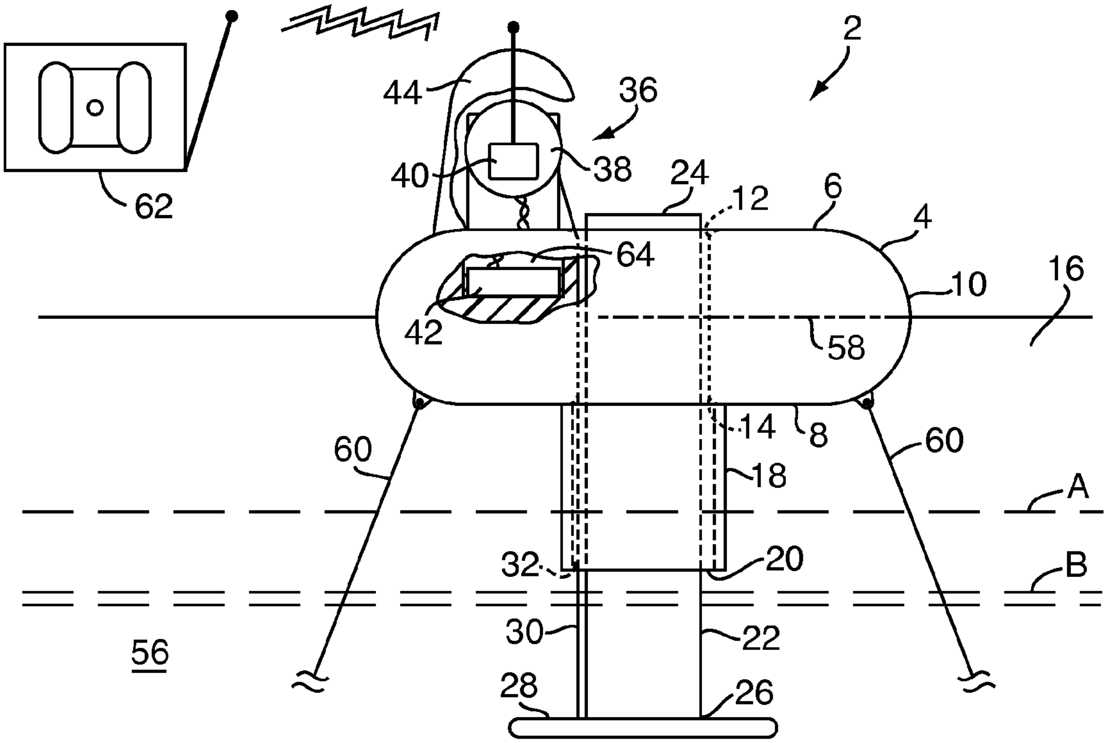
FIG. 1 is an elevation view of the ice safety device deployed on a body of water, according to one embodiment of the present invention.

Referring to FIG. 1, an ice safety device 2 includes a floating base 4 having an upper surface 6 and a lower surface 8, a circumferential surface 10, and openings 12, 14 extending through the upper and lower surfaces 6, 8. The floating base 4 has a known waterline 58 demarcating the portion of the base above the water and the portion of the base below the water when the device floated in a pond, stream or lake. The waterline 58 is a physical characteristic of the base 4 of the device, and not necessarily a visible line marked on the base.

The floating base 4 placed in the water of the pond, stream, or lake before the water freezes, and is held in a selected location by tethers 60. Preferably, two or more tethers 60 are used and the tethers 60 are disposed at angles outward from the vertical axis of the device 2 so as to avoid interference with the operation of the device as explained below.

The floating base 4 surrounds and supports a tube 18 that is installed through the opening 14 in the lower surface 8. The tube 18 extends from the lower surface 8 of the floating base 4 to an open distal end 20 a predetermined distance below the waterline 58, which distance corresponds to a predetermined ice thickness considered to be safe. The tube 18 may be adjustable relative to the floating base 4 for setting a safe ice thickness for various activities.

The tube 18 houses a rod 22. The rod 22 may be hollow and closed or solid and has a near end or an upper end 24 housed within the tube 18 and a lower end or a far end 26 carrying a disc or a crossbar 28. The rod 22 is slidably movable up and down within the tube 18. The rod 22 is supported in the tube 18 by means of an extending and retracting mechanism including a cable 30 and a motor driven pulley 36. The cable is disposed in an annular gap 32 defined between the rod 22 and the tube 18. One end of the cable 30 is attached to the crossbar 28, and the other end of the cable 30 is wrapped on the pulley 36 which is mounted on an axle 34 and driven by a motor 38.

A motor control comprises a remote control receiver 40 connected to the motor 38 for actuating the motor, and a power supply 42 connected to the motor 38 and to the remote control receiver 40. The motorized pulley 36 is mounted to the floating base 4 at the upper surface 6. Preferably, the motorized pulley 36 is sheltered under a weatherproof cover 44, which can be mounted to the floating base 4.

In the embodiment of FIG. 1, a portion of the rod 22 adjacent to the near end 24 is painted or otherwise marked for high visibility and serves a visible indicator of the ice condition.

The floating base 4, the tube 18, the rod 22, and the other components may be made from a variety of materials. The floating base 4 is sufficiently rigid to withstand crushing when the water changes to ice 16 as illustrated in FIG. 1. It is particularly preferred that the materials for the floating base 4, the tube 18, and the rod 22 should be selected for durability and for low thermal conductivity. In embodiments having a hollow floating base 4, thermal conductivity is of lesser concern for selecting the material of the base, while strength and durability are of greater concern. It is preferred that the surface of the rod 22 should not be excessively smooth or lubricious, and that the surface of the rod 22 should exhibit satisfactory friction or adhesion in contact with ice. In embodiments wherein grease is used to seal the gap 32 between the rod 22 and the tube 18, it is preferred that grease should cling more to the tube 18 than to the rod 22. For example, the tube 18 may be internally threaded for retention of the grease.

In operation, the ice safety device 2 shown in FIG. 1 is initially deployed on a body of water 56 before ice forms. As air temperature drops or radiation cooling begins, ice begins to form at the surface of the water and progresses downwardly to achieve increased thickness. The circumferential surface 10 of the floating base 4 interacts with the ice to keep the waterline 58 approximately at the top surface of the ice. Periodically, the thickness of the ice can be tested for safety from a remote location by means of a transmitter 62. For example, a person standing at the shoreline of the water can operate the transmitter 62 to activate the motorized pulley 36 via the remote control receiver 40, thereby causing the motorized pulley 36 to retract the rod 22 into the tube 18.

While the thickening ice remains thin and above the distal end 20 of the tube 18 (as shown in FIG. 1 by the dashed line "A"), the rod 22 is freely movable and can be retracted upward in the tube 18 by the motorized pulley 36. The extended upper end of the retracted rod is then visible from the remote location, and indicates an unsafe ice condition. Preferably, the rod 22 is painted red or orange to indicate a "thin ice" or "no-go" signal. Under such ice conditions, when the motorized pulley 36 is deactivated or reversed by the transmitter 62, the axle 34 turns and causes the cable 30 to unwind and deploy the rod 22 downward due to the weight of the rod 22 in preparation for the next thickness test.

When the thickening ice reaches a level below the distal end 20 of the tube 18 (as shown in FIG. 1 by the double-dashed line "B"), the ice adheres to the rod 22 and prevents retraction of the rod 22 into the tube 18 in response to a test signal from the remote transmitter 62. No "thin ice" or "no-go" signal is indicated. Thus the location of the distal end of the tube 18 corresponding to ice level "B" is set so that the absence of a visible "no-go" indication means the ice can support surface loads required for weight-bearing activities (for example, ice fishing) with a reasonable margin of safety. Typically, level "B" will be in excess of six inches below the floating base waterline 58.

Leakage of water into the necessary gap 32 between the tube 18 and the rod 22 can result in formation of ice that can bind the rod 22 in the tube 18 before the body of water 56 has frozen down to ice level "B". To prevent such leakage, the gap 32 between the tube 18 and the rod 22 is sealed at least at the distal end 20 of the tube 18. The gap 32 can be sealed by a variety of methods. Preferably, grease is applied uniformly to the inner surface of the tube 18. Also, or as an alternative sealing means, an annular wiper seal can be installed at the distal end 20 of the tube 18. Other sealing methods and devices will be apparent to those of ordinary skill. Contact with water also can also result in interruption of battery operation in the power supply 42. Thus, all connections between the motor 38 and the power supply 42 preferably are made in a waterproof chamber 64.

Figure 2:
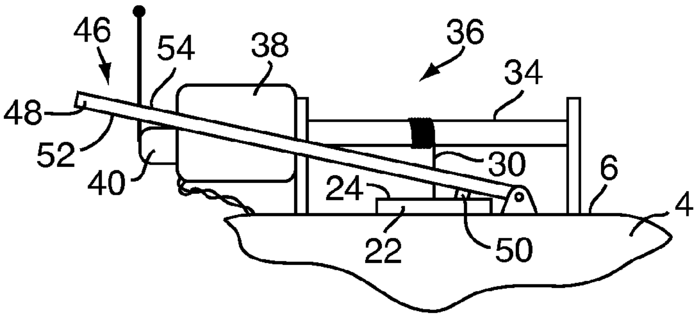
FIG. 2 is a partial elevation view of the ice safety device including a visible indicator according to another embodiment of the present invention.

Various alternate embodiments also come within the principles of the present invention. For example, referring to FIG. 2, wherein like reference numerals represent like parts, a second embodiment of the ice safety device 2 is provided with a separate visible indicator 46. The visible indicator 46 is mounted to the upper surface 6 of the floating base 4 so that upward motion of the rod 22 will deploy the visible indicator 46. The visible indicator 46 shown in FIG. 2 is pivotally mounted to the upper surface 6, and includes a flag 48 and a prop 50 protruding substantially perpendicularly from an inward surface 52 of the flag 48. The flag 48 is made of stiff material, and the outward surface 54 of the flag 48 is highly visible. Preferably, the outward surface 54 is colored red or orange to indicate "thin ice" or "no-go". Alternative structures and methods for a visible indicator 46 will be apparent to those of ordinary skill, for example, a system of electrical lights, a green light activated by the transmitter 62 when an activation signal is received by the motor control, and a red light when the rod is retracted. The dual light system provides a visible indication of device operation and ice condition.

Figure 3:
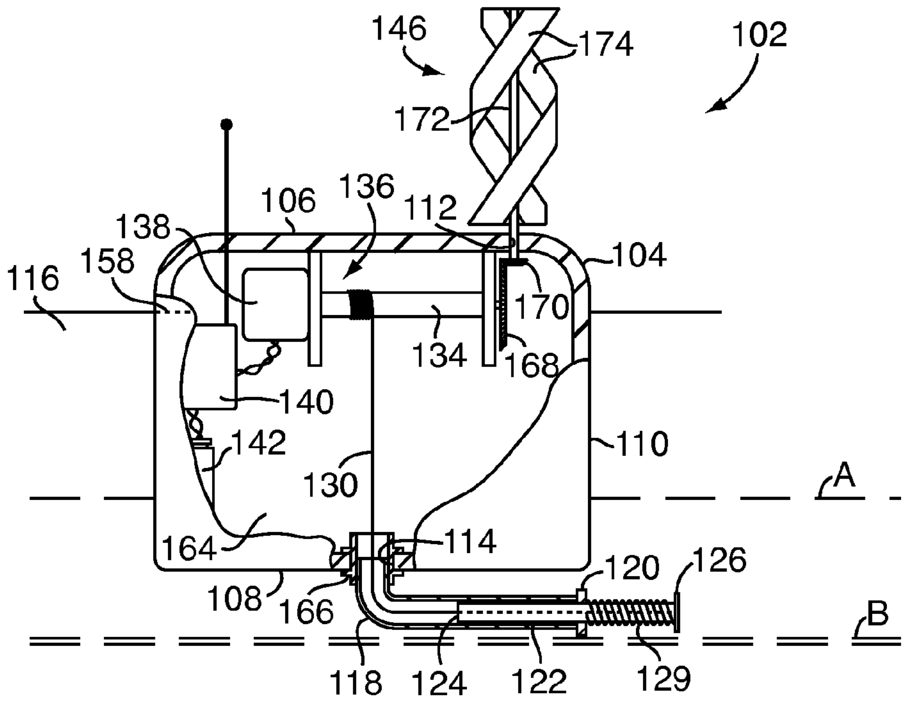
FIG. 3 is an elevation view of the ice safety device according to still another embodiment of the present invention.

Referring to FIG. 3, a third embodiment of the ice safety device 102 includes a hollow floating base 104 having upper, lower, and circumferential surfaces 106, 108, 110 defining a waterproof chamber 164. Components similar to those components shown in FIGS. 1 and 2 are indicated by similar "100" series reference numbers. The upper and lower surfaces 106, 108 include upper and lower openings 112, 114, respectively. The lower opening 114 is sealed by a waterproof fitting 166. Below the lower surface 108, and outside the hollow floating base 104, a tube 118 is mounted to the waterproof fitting 166. The tube 118 extends from the waterproof fitting 166 to a distal end 120. The tube 118 houses a hollow rod 122 having a near end 124 disposed within the tube 118 and having a far end 126 extending from a distal end 120 of the tube 118. The hollow rod 122 is slidably movable within the tube 118. A spring 129, disposed between the distal end 120 of the tube 118 and the far end 126 of the hollow rod 122, draws the hollow rod 122 to an extended position outwardly of the tube 118. The waterproof chamber 164 contains a motorized pulley 136, from which a cable 130 extends through the waterproof fitting 166, the tube 118, and the hollow rod 122. The cable 130 is fastened to the far end 126 of the hollow rod 122. The cable 130 restrains the hollow rod 122 within the tube 118, against the outward bias of the spring 129.

Activation of the motorized pulley 136 operates the cable 130 to retract the hollow rod 122 into the tube 118. Rotation of the motorized pulley 136 drives a visible indicator 146 via a bevel gear 168 and pinion 170. The visible indicator 146 includes a plurality of vanes 174 mounted on a vertical shaft 172 that is connected to the bevel pinion 170. Rotation of the vanes indicates the rod 122 is being retracted, and therefore, the thickness of the ice has not reached the level B. Therefore, rotation of the vanes indicates "thin ice" or a "no-go" condition. When the thickening ice reaches the level B, the rod 122 remains fixed, and the vanes do not rotate, which signals a minimum or better ice condition.

With ice safety device 102 shown in FIG. 3 the entire tube 118 and the hollow rod 122 are disposed at ice level "B". Hence, infiltration of water and ice between the tube 118 and the hollow rod 122 does not detract from the operation of the ice safety device 102, and a seal between the two parts is not needed. The waterproof fitting 166 prevents entry of water into the waterproof chamber 164 containing the motorized pulley 136.

Figure 4:
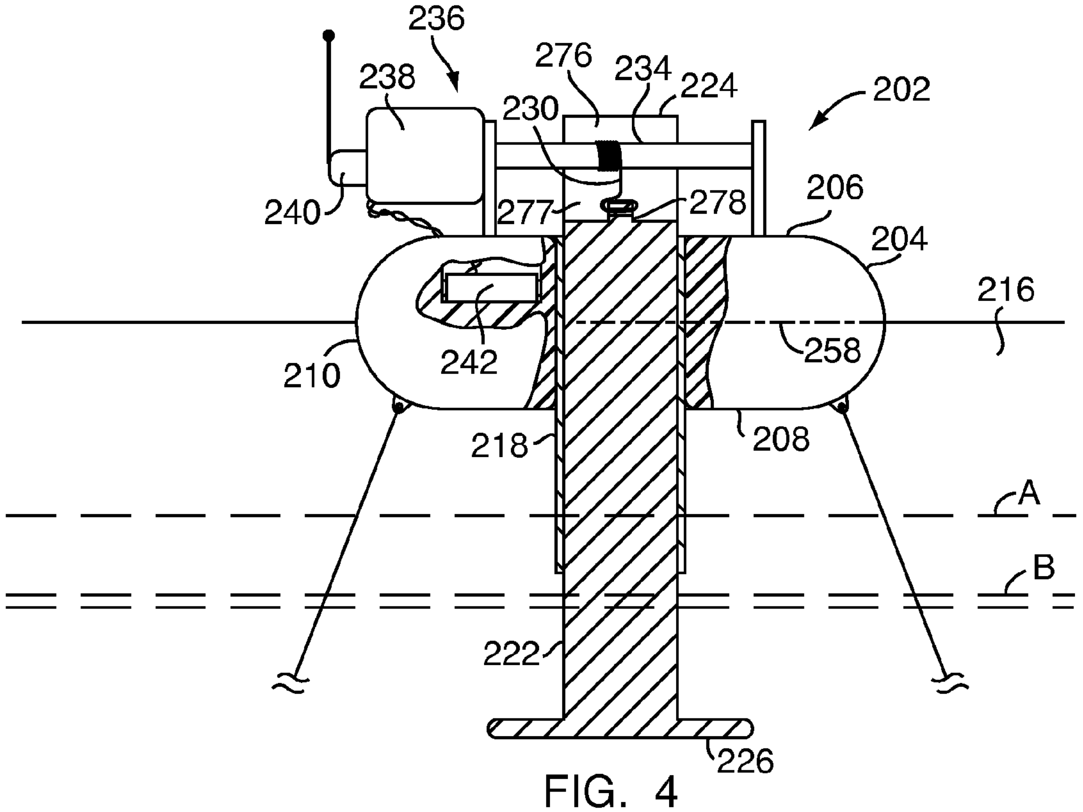
FIG. 4 is an elevation view of the ice safety device according to still a further embodiment of the present invention.

Referring to FIG. 4, a fourth embodiment of the ice safety device 202 includes a floating base 204 supporting a tube 218. Components similar to those components shown in FIGS. 1 and 2 are indicated by similar "200" series reference numbers. The tube 218 houses a rod 222 that has a longitudinal slot 276 cut in its near end 224 and extending toward its far end 226. At the inward end 277 of the slot 276, a lug 278 is formed for receiving a cable 230. The cable 230 is connected at its other end to a motorized pulley 236 mounted on the floating base 204. The slot 276 allows the rod to straddle the pulley 236 and cable 230 so that the rod 222 can extend above the pulley axle 234 when fully retracted. In this embodiment, sealing between the extendable rod 222 and the tube 218 is enhanced because the cable 230 does not extend through the annular gap defined between the rod and the tube.

Activation of the motorized pulley 236 by a remote control transmitter causes the cable 230 to retract the split rod 222 upward into the tube 218 so that the near end 224 of the split rod 222 protrudes above the floating base 204, providing a visible "no go" indication of ice thickness insufficient to restrain upward motion of the split rod 222.

In one working embodiment, the floating base is made from polymer foam and is about eight (8) to ten (10) inches across and about three (3) inches thick. Dimensions of the floating base are varied according to the weight of components mounted on the base. The tube is a PVC pipe about one (1) inch in diameter that extends about four (4) inches below the floating base waterline. Length of the tube is varied according to the required safe ice thickness. The rod is a plastic rod about seven-eighths of an inch (⅞") in diameter. The near end of the rod is made highly visible by shiny orange paint so that the rod can be seen at a distance of at least about forty (40) feet. The cable is wire or heavyweight fishing string. The motorized pulley includes a remote-control toy motor, axle, remote control receiver, and power supply. Grease is used for sealing the gap between tube and rod. The remote control receiver and transmitter are operable to activate the motor a distance of at least about forty (40) feet to permit operation from the shore. Fishing lines and weights are used as tethers.

Thus, the present invention provides an ice safety device for periodically checking or testing the thickness of ice on a body of water, without actually going out onto the ice. The ice safety device is easily deployed, can be tethered in place at a desired measurement location, and is relocatable. The ice safety device is simple in operation, and provides an easily understood visual indication of ice thickness.

Although this invention has been shown and described with respect to the detailed embodiments shown in the drawings, it will be understood by those skilled in the art that various changes in form and detail thereof may be made without departing from the spirit and the scope of the invention. For example, the floating base may be a hollow shell or hull, in which case the top surface is defined by the uppermost surface of the hull and the lower surface is defined by the lowermost surface of the hull. A solenoid, pivoted beam linkage, or other means for retracting the rod into the tube, can be used in place of the motorized pulley. Additionally, although a remote control receiver activates the embodiments shown in FIGS. 1 through 4, the means for retracting the rod also can be periodically activated by a timer or similar activating means. Furthermore, although in FIGS. 1-4 a visible indicator is shown as being operated by linear motion of the rod, other types of indicators, such as lights or audible indicators can also be used. Accordingly, the invention has been described by way of illustration rather than limitation.

What is claimed is:

1. An ice safety device comprising:

a floating base having an upper surface, a lower surface, and a waterline disposed between the upper and lower surfaces;

a tube supported by said floating base and extending below the waterline of said floating base to an open distal end located at a predetermined distance below the waterline of said floating base;

a rod having near and far ends, the rod being housed in said tube, the far end of the rod protruding from the open distal end of said tube, the rod being slidably retractable into said tube;

a motorized pulley mounted to said floating base, the motorized pulley including a motor, a power supply, a remote control receiver operatively connected to the motor for activating the motor, and a cable operatively connected to said rod for retracting said rod into said tube by activation of the motor; and a visible indicator operatively connected to said rod and to the upper surface of said floating base, wherein retraction of said rod into said tube produces a visible indication at the upper surface of said floating base, and formation of ice adjacent to said tube distal end prevents retraction of said rod into said tube.

2. The device of claim 1, wherein said visible indicator is a portion of said rod adjacent to the near end of said rod.

3. The device of claim 1, wherein said visible indicator is a flag hingedly mounted to said floating base and pivotally movable by upward motion of said rod.

4. The device of claim 1, wherein said tube extends vertically through said floating base.

5. The device of claim 4, further comprising a visible indicator operatively connected to the rod for providing the visible indication of retraction of said rod.

6. The device of claim 4, further comprising a visible indicator operatively connected to the motorized pulley for providing the visible indication of retraction of said rod.

7. The device of claim 1, wherein said floating base is hollow.

8. The device of claim 7, wherein said tube is disposed horizontally beneath the lower surface of said floating base, and the cable extends through the opening formed in the lower surface of said floating base.

9. The device of claim 8, further comprising a visible indicator operatively connected to the motorized pulley for providing the visible indication of retraction of said rod, wherein said visible indicator includes a shaft extending through the opening formed in the upper surface of said floating base.

10. The device of claim 1, wherein the far end of said rod is biased away from the distal end of said tube.

11. The device of claim 10, wherein the far end of said rod is spring-biased away from the distal end of said tube.

12. The device of claim 10, wherein said rod is negative buoyant.

13. The device of claim 1, further comprising a crossbar extending substantially perpendicularly from the far end of said rod.

14. An ice safety device comprising:

a floating base having a predetermined waterline, which line, when the device is floating in water, differentiates the portions of the base above and below the water;

an immersion tube supported in the floating base and extending to an open distal end located a predetermined distance below the waterline;

a test rod having near and far ends, the rod being slidably mounted in the immersion tube for movement between retracted and extended positions in the tube, the far end of the rod protruding from the open distal end of the tube in the extended position;

an extending and retracting mechanism mounted to the floating base and connected to the test rod, the mechanism including a remotely controlled motor for moving the rod between the extended and retracted positions in the tube; and an indicator on the floating base providing an indication upon activation of the motor that the test rod has not been retracted into the tube due to ice formation around the rod at the distal end of the tube.

15. The ice safety device as defined in claim 14 wherein the remotely controlled motor includes a motor control having a power supply and a remotely controlled receiver activating the motor from the power supply upon receipt of an activating signal from a remote location.

16. The ice safety device as defined in claim 14 wherein the indicator is a visual indicator providing a visible signal.

17. The ice safety device as defined in claim 14 wherein the indicator is an audible indicator providing an audible signal.

18. The ice safety device as defined in claim 14 wherein the indicator includes a transmitter providing a signal to a remote location.

19. The device of claim 14, wherein the floating base is hollow and the means for retracting the rod into the tube and the remote control receiver are disposed within the hollow floating base.

20. A method for using an ice safety device to obtain a visible indication of unsafe ice thickness, comprising:

deploying in a body of water an ice safety device including a floating base supporting a tube, a rod housed within and extending from the tube, remotely-actuable means for retracting the rod into the tube, and a visible indicator of rod position relative to the tube, wherein the tube and the rod are immersed in the water at a predetermined distance below the waterline of the floating base;

remotely activating said means for retracting the rod into the tube; and observing said visible indicator.

* * * * *